Figure 1:
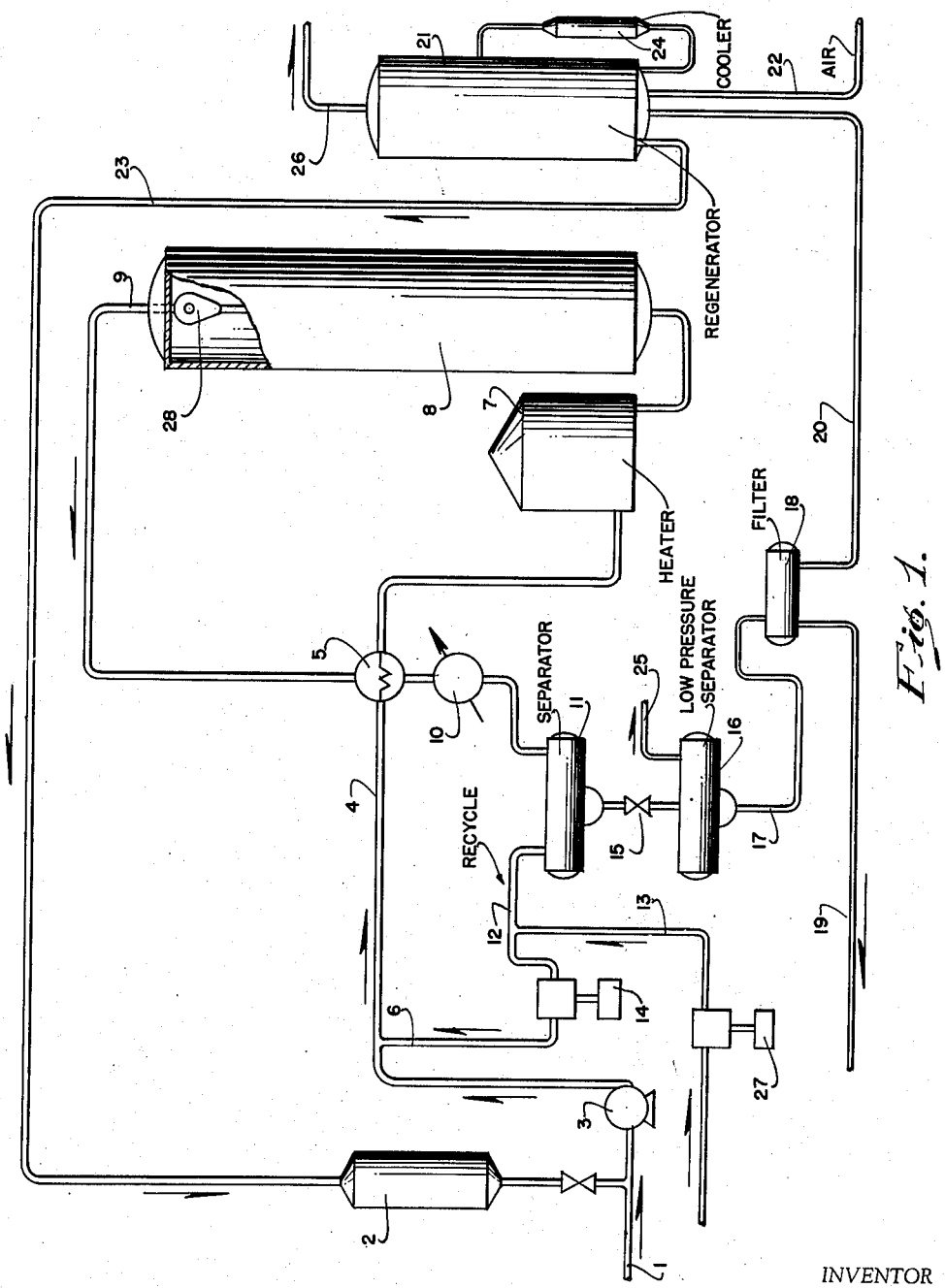

Nov. 11, 1952  P. W. CORNELL  2,617,709
CATALYTIC PROCESS
Filed Nov. 10, 1950

INVENTOR
Paul W. Cornell

BY *(signature)*

*(signature)* ATTORNEY

Patented Nov. 11, 1952

2,617,709

UNITED STATES PATENT OFFICE 2,617,709

CATALYTIC PROCESS

Paul W. Cornell, Mount Lebanon, Pa., assignor to Gulf Oil Corporation, Pittsburgh, Pa., a corporation of Pennsylvania Application November 10, 1950, Serial No. 195,070

4 Claims. (Cl. 23—1)

This invention relates to a catalytic process, and more particularly to a method for conducting fluidized catalytic processes at elevated pressures.

The prior art has encountered several serious difficulties in the application of fluidized moving bed catalytic procedure to high pressure type operations. Perhaps the most serious of these is the inability of regenerating the fluid catalyst at low pressures when a high pressure fluidized reaction is used. Furthermore, there is the serious difficulty of withdrawing the catalyst in powder form from the high pressure reactor.

As a result the commercial utilization of fluid type procedure has been restricted to low pressure operation, and nonfluidized methods such as the various fixed bed catalytic methods have been employed in processes involving elevated pressures. This in turn has led to a number of serious failings in high pressure type procedure.

Thus when a fixed bed catalytic reactor is utilized, the shell of the reactor must be made of expensive thermo-resistant materials to withstand the high temperatures of regeneration, since the use of a separate regenerator is not feasible. Furthermore, in these cases the on-stream factor for each reactor is but of the order of about 50 per cent, since it is necessary to have the reactor out of service for regeneration. Since high pressure alloy vessels are very expensive this loss of on-stream time due to the discontinuous nature of the process constitutes a serious impediment to the amortization of the plant investment.

Furthermore, the utilization of fluidized type practice permits a much closer degree of temperature control than may be obtained with either fixed bed catalytic systems, or other forms of moving catalyst bed methods.

This invention has as an object the provision of a continuous catalytic method for operating at elevated pressures.

A further object of this invention is to provide a continuous catalytic method for operation at elevated pressures in which the catalyst may be regenerated in a separate vessel.

A different object of this invention is to provide a continuous catalytic method for fluidized operation at elevated pressures in which the fluidized catalyst may be regenerated at substantially atmospheric pressures.

Another object of the present invention is to increase the on-stream factor of a catalytic reactor operating at elevated pressures.

A still further object of the present invention is to provide a method for utilizing fluidized catalytic procedure at elevated pressures.

An additional object of the present invention is to provide a fluidized catalytic process in which the catalyst may be withdrawn in powdered form from a high pressure on-stream reactor.

Other objects will appear hereinafter.

These and other objects are achieved by the process of the present invention which comprises establishing a body of suspended turbulent catalyst particles in a high pressure system, continuously adding catalyst particles to said catalyst body in relatively small amounts as compared with the amount of catalyst in said catalyst body, passing vapors to be catalytically converted through the body of suspended turbulent catalyst particles, continuously removing a mixture of suspended catalyst and reaction product in vapor form from the catalyst body at a rate whereby the catalyst is retained in the reactor a preferentially long time as compared with the vapors, the amount of catalyst thus removed with the reaction product approximately equaling that which is continuously added to the catalyst body, cooling this mixture of suspended catalyst and reaction product at the elevated pressure to form a liquid-catalyst slurry mixture and withdrawing this slurry mixture from the high pressure system.

In the following examples and description I have set forth several of the preferred embodiments of my invention but it is to be understood that they are set forth for the purpose of illustration and not in limitation.

My invention is applicable to all chemical catalytic reactions conducted under elevated pressures and involving liquid reaction products and is especially applicable to chemical reactions having low catalyst to reactant weight ratios, such as catalyst to oil ratios of less than 1. My invention is particularly applicable to chemical reactions having a neutral to exothermic heat balance. However, my invention may also be applied to endothermic reactions, in which case it may become necessary to utilize external heating to maintain the on-stream reaction temperature. One method for achieving this which I have found to be very useful is to employ the catalyst particles as heat transfer agents, since these particles constitute efficient means for transferring heat. However, with strongly endothermic reactions and with low catalyst to oil ratios it may be necessary to heat the fluidized catalyst. This may be accomplished by circulating the catalyst to an external heater and thence back to the reactor or by placing heating surfaces in the reactor. See for instance U. S. Patent 2,488,406 issued November 15, 1949 to J. H. Hirsch. Examples of superatmospheric pressures which may be utilized in my invention are those of the order of 5 atmospheres, 10 atmospheres, 20 atmospheres, 50 atmospheres, 100 atmospheres, 500 atmospheres, 1000 atmospheres and beyond.

Examples of chemical catalytic reactions to which my invention may be applied include hydrodesulfurization, hydroforming, hydrocracking, destructive hydrogenation, production of phthalic anhydride, hydrocarbon oxidation, polymerization, catalytic reforming in the presence of hydrogen, hydrogenation of phenol to cyclohexanol, hydrogenation of aldehydes, hydrogenation of carbon monoxide to methane or higher hydrocarbons or to methanol, oxidation of benzene, amination of olefins, and the dehydrogenation of paraffins and olefins.

As illustrative of my invention reference should be made to the accompanying figure. Charge feed enters the system through line 1. Finally divided catalyst from catalyst hopper 2 is admixed with the charge feed in line 1 in the desired proportions of catalyst and charge feed to form a charge feed-catalyst slurry. These proportions vary with the catalyst that is utilized and the reaction conditions, but if possible the catalyst should be chosen so that a low weight ratio of catalyst to charge feed may be utilized.

The charge feed-catalyst slurry is pressurized by means of pump 3 to a pressure equal to, or greater than the desired operating pressure in the catalytic reactor. This pressure, as indicated previously, should be of the order of 5 atmospheres or more, and may in some instances, exceed 1000 atmospheres. The slurry is then passed through line 4. In reactions requiring an additional reactant, the additional reactant is added through line 6. The slurry is then heated by indirect heat exchange in heat exchanger 5 with hot products from the reactor. The heated slurry is then passed through a heater 7 and heated to the desired reaction temperature. At this temperature the liquid portion of the charge feed is substantially vaporized. Following this the mixture enters catalytic reactor 8.

Reactor 8 contains a large body of suspended turbulent catalyst particles which are slowly moving upwardly. These catalyst particles are suspended in the vaporous or gaseous charge feed and are in the condition known as "fluidized," i. e., they simulate a number of fluid properties such as ease of transportation, etc. These catalyst particles are also undergoing a hindered settling effect which means that they are retained in reactor 8 for a comparatively longer time than the charge feed. As a further result of this hindered settling effect, the turbulent suspended catalyst particles form two phases, the first being a lower dense phase formed and maintained at the base of reactor 8, and the second a more dilute or disperse phase at the upper portion of reactor 8. For any given set of conditions, as will be more fully discussed below, the two phases are at equilibrium with each other, and accordingly, the comparative size of each phase, as well as the total amount of catalyst within reactor 8, is substantially constant. The equilibrium point which determines the relative size of each phase is a function of a number of factors, such as the diameter of the reactor; the height of the fluid bed; the particle size distribution, that is, the range of sizes of the catalyst particles; the catalyst particle density; the catalyst particle size and shape; the reaction temperature and pressure; and such functions of the fluid medium within the reactor as its viscosity and velocity. The determination of the equilibrium point and the factors affecting it has undergone an exhaustive study by various workers, and for any given set of conditions, the determination of the equilibrium point may be made by one skilled in the art after a few experimental runs. The following literature references contain detailed treatment of this subject matter: "Improvements increase efficiency of fluid catalytic cracking processes," Murphree et al., Oil and Gas Journal, March 3, 1945, p. 64; "Fluidizing processes," Parent et al., Chemical Engineering Progress, vol. 43, p. 429 (August, 1947); "Fluidized technique," Coke and Gas, September, 1947, p. 261; "Introduction to fluidization," Leva et al., Chemical Engineering Progress, vol. 44, p. 511; "Fluidization in chemical reactions," Kalbach, Chemical Engineering, January, 1947, p. 105; "Fluidization of solid particles," Wilhelm et al., Chemical Engineering Progress, vol. 44, p. 201.

The constant equilibrium of the two phases with each other is reached even when the onstream period is commenced with the reactor devoid of catalyst particles. For under these conditions, due to the hindered settling effect, there will be an increase in the amount of catalyst within the reactor, which increase will continue until the equilibrium point is reached. At this equilibrium point, the amount of catalyst entering the reactor will be approximately equal to that leaving the reactor. Assuming all other factors to remain constant, the variant with the through-put will be the velocity, and if the velocity is increased, the dense phase portion of the fluid bed will be decreased and the height of the disperse phase will accordingly be increased. Thus, any desired through-put can be achieved by varying the velocity, since if other factors are kept constant, an equilibrium point will be reached with the total weight of catalyst within the reactor and the relative amounts of catalyst in the dense and disperse phase being constant values. Furthermore, it follows that the average residence time of the catalyst within the reactor will be the quantity of catalyst held-up within the reactor divided by the rate of catalyst introduction, since at equilibrium the catalyst leaves at substantially the same rate at which it enters.

Since in commercial operations it is desirable to restrict the size of the reactor to the minimum volume which will produce a given yield of product, it is desirable to transfer the equilibrium point between the dense phase and the disperse phase as much as possible towards the dense phase. This can be achieved by installing cyclone separator 28 within reactor 8. Thus, if cyclone separator 28 operates at an efficiency of 95 per cent, it is apparent that the catalyst loading at the entrance to cyclone separator 28 will be twenty times that at the exit. Since the inlet to cyclone separator 28 is located near the top of reactor 8, it thus becomes possible to increase the catalyst concentration at the top of the reactor twentyfold, thereby decreasing the height of the disperse phase and increasing the dense phase. Thus, it is seen that the incorporation of cyclone separator 28 within reactor 8 increases the capacity or, conversely, decreases the absolute reactor size required for a given capacity.

Since the quantity of catalyst which must be present initially within reactor 8 is a function of the desired residence time and the desired charging and removing rate of the catalyst it may readily be seen that my invention is most applicable to reactions utilizing low catalyst to oil ratios since in these cases a large amount of feed may be catalytically treated without requiring an unduly large bed of the catalyst.

The charge feed remains within reactor 8 a relatively short time as compared with the catalyst residence time and is catalytically converted while moving rapidly upwardly through reactor 8. The unreacted charge feed, catalyst, and reaction products are removed from reactor 8 through line 9. The products, unreacted feed charge and catalyst from reactor 8 are passed through line 9, heat exchanger 5 and cooler 10. In cooler 10 at least a portion of the normally liquid components are condensed. This condensed mixture of liquid, gases and catalyst is passed from cooler 10 to high pressure separator 11. Within high pressure separator 11 the gases are separated and if they can be used in conjunction with the charge feed, they are recycled. These recycled gases may be removed by line 12 and combined with fresh reactant entering line 12 from reactant tank compressor 27 and line 13. This mixture is then compressed by compressor 14 and passes through line 6 into line 4 where it is admixed with the feed charge and catalyst slurry. The remainder of the products is removed from the bottom of high pressure separator 11 through pressure reducing valve 15 to low pressure separator 16. Pressure reducing valve 15 should be of the type resistant to erosion and is generally characterized by having a streamlined plug operating against a venturi or otherwise streamlined shaped seat. Valves of this type are continually used in services where erosion is a factor and where a substantial pressure drop must be taken across the valve. Alternatively, in place of a single pressure reducing valve 15, a plurality of valve could be utilized and the pressure reduced by expanding in stages (not shown).

Liquid products containing the catalyst are removed from the bottom of low pressure separator 15 and any unabsorbed gases which may be present are removed as overhead by means of line 25. The gases in line 25 may be used for recycling by means not shown, or alternatively they may be utilized for other purposes, or vented to the atmosphere. The liquid product containing the catalyst is passed through line 17 to a filter system 18 wherein the catalyst is filtered from the products of the reaction. The products of the reaction are removed from the system through line 19 where they may undergo further processing (not shown). The catalyst is passed through line 20 to low pressure regenerator 21. In this regenerator the catalyst is regenerated to substantially its original form, and any carbonaceous or other type contaminants are removed. I have found that a convenient means for regenerating the catalyst is to suspend it in a regenerative gas introduced into low pressure regenerator 21 through line 22. The temperature during regeneration is controlled by passing the catalyst and regeneration gas mixture through outside catalyst cooler 24. The regenerated catalyst is removed from low pressure regenerator 21 through line 23 to catalyst hopper 2. Any catalyst fines too small to be utilized further in the process may be removed from the regenerator through line 26.

It is obvious that my process may be modified by one skilled in the art. It is to be understood that these modifications constitute part of my invention and are to be construed as included within the appended claims. They include by way of example the substitution of pressurizing lock chambers in place of charging the catalyst as a slurry, as indicated in co-pending U. S. application Ser. No. 195,061 filed November 10, 1950, to Thomas P. Joyce. When pressurizing lock chambers are used, separate heaters for the charge feed and for the catalyst may be used, and the catalyst and charge feed may be introduced separately. Different prereaction temperatures could be utilized for the various constituents of the charge feed if it is composed of a number of constituents. Moreover, a greater or smaller number of pressure separators may be utilized.

The temperature and pressure conditions and other process variables for my invention vary depending upon the type process that is utilized and the specific type feed charge, and catalyst that are used. Thus, in the case of the hydrodesulfurization of hydrocarbons, I have found that it is most advantageous to utilize a reaction temperature of between about 600° and 950° F. within reactor 8. This temperature is preferably between about 750° and 950° F. when hydrodesulfurizing heavy feed charges such as Kuwait or Baxterville Mississippi crude or topped or reduced crude; or other high boiling petroleum fractions. In the hydrodesulfurization of hydrocarbons a pressure of between 100 and 2000 p. s. i. is useful although a pressure of between 500 and 1000 p. s. i. is preferable. The best hydrodesulfurization catalysts are the "hydrogenating" type catalysts such as the group VI or group VIII metals, oxides, and compounds, either singly or as mixtures. Preferably these substances should be supported on carriers such as Alfrax, Porocel, bauxite, diatomaceous earth, cracking clays, silica-aluminas, aluminum silicates, asbestos, alumina, etc. For hydrodesulfurization I have found the best catalyst to oil ratios to be of the order of 1:2 to 1:16. Thus, a weight ratio of the order of 1:10 corresponds to about 30 pounds of catalyst per barrel of oil.

For the regeneration stage any conventional regenerating gases may be utilized to reactivate the catalyst and/or to remove carbonaceous and/or other contaminants such as sulfur. Thus oxygen, or oxygen-containing gases such as air or mixtures of air with other gases such as steam, may advantageously be utilized. The pressures within the regenerator should usually be considerably lower than the pressures in the reactor and are advantageously about atmospheric such as about 5 atmospheres or less. In the case of hydrodesulfurization of hydrocarbons hydrogen sulfide will be given off as a product, and this may be separated from the remainder of the products by conventional means such as by absorption in ethanolamine. The quantity of hydrogen that should be present during hydrodesulfurization should usually be of the order of 300 S. C. F./Bbl. or greater, such as of the order of 500 to 20,000 S. C. F./Bbl. In hydrodesulfurization I have found that the preferred residence time of the catalyst within reactor 8 should be very great such as of the order of 10 hours or so, whereas that for the oil vapors should be of the order of 1 to 2 minutes.

My invention permits continuous fluidized operation to be carried out under elevated pressures. The catalyst may be withdrawn, regenerated and reutilized. The regeneration may be accomplished at pressures in the neighborhood of atmospheric pressures, whereas the on-stream portion of the cycle may be conducted at greatly elevated pressures. In addition the on-stream reactor may be used continuously or almost continuously without being withdrawn from service to regenerate the catalyst. Moreover, the composition of the product will not vary greatly and the heat balance may be controlled exactly.

In the appended claims the expression "vapors" includes the gaseous form of any substance which may be liquefied at any temperature, and includes substances which at ordinary temperatures are gases such as carbon monoxide.

What I claim is:

1. The process of carrying out a continuous catalytic reaction which results in deposition of coke on the catalyst and necessitates regeneration of the catalyst to maintain catalyst activity, which process comprises establishing a body of suspended turbulent catalyst particles in a high pressure system, continuously adding catalyst particles to said catalyst body in relatively small amounts as compared with the amount of catalyst in said catalyst body, said amounts corresponding to one part of catalyst to between about 2 to 16 parts by weight of reactant, passing vapors to be catalytically converted through the body of suspended turbulent catalyst particles, continuously removing a mixture of suspended catalyst and reaction product in vapor form from the catalyst body at a rate whereby the catalyst is retained in the reactor a preferentially long time as compared with the vapors, the amount of catalyst thus removed with the reaction product approximately equaling that which is continuously added to the catalyst body, cooling this mixture of suspended catalyst and reaction product at the elevated pressure to form a liquid-catalyst slurry mixture, withdrawing this slurry mixture from the high pressure system, separating the catalyst particles from the liquid portion of this withdrawn slurry mixture, regenerating these catalyst particles and continuously re-introducing these regenerated catalyst particles into said body of suspended turbulent catalyst particles in said elevated pressure system.

2. The process of carrying out a continuous catalytic reaction which results in deposition of coke on the catalyst and necessitates regeneration of the catalyst to maintain catalyst activity, which process comprises establishing a body of suspended turbulent catalyst particles in a high pressure system, continuously adding catalyst particles to said catalyst body in relatively small amounts as compared with the amount of catalyst in said catalyst body, said amounts corresponding to one part of catalyst to between about 2 to 16 parts by weight of reactant, passing vapors to be catalytically converted through the body of suspended turbulent catalyst particles, continuously removing a mixture of suspended catalyst and reaction product in vapor form from near the top of the catalyst body, said removed catalyst being a substantially larger amount than the small amount that is added continuously to the catalyst body, segregating this removed catalyst into two portions, one of said portions approximately equaling the small amount of catalyst which is continuously added to the catalyst body and the other representing the excess portion of said catalyst, returning the excess portion of said removed catalyst to the catalyst body whereby the catalyst is retained in the reactor a preferentially long time as compared with the vapors, cooling the other portion of removed catalyst with the reaction product at the elevated pressure to form a liquid-catalyst slurry mixture, withdrawing this slurry mixture from the high pressure system, separating the catalyst particles from the liquid portion of this withdrawn slurry mixture, regenerating these catalyst particles and continuously re-introducing these catalytic particles into said body of suspended turbulent catalytic particles in said elevated pressure system.

3. The process of carrying out a continuous catalytic reaction which results in deposition of coke on the catalyst and necessitates regeneration of the catalyst to maintain catalyst activity, which process comprises establishing a body of suspended turbulent catalyst particles in a high pressure system, continuously adding substantially vaporized reactants and catalyst particles to said catalyst body with the catalyst particles being added in relatively small amounts as compared with the amount of catalyst in said catalyst body which amounts correspond to one part of catalyst to between about 2 and 16 parts by weight of reactant, passing said reactants through the body of suspended turbulent catalyst particles, continuously removing a mixture of suspended catalyst and reaction product in vapor form from near the top of the catalyst body, said removed catalyst being a substantially larger amount than the small amount that is added continuously to the catalyst body, segregating this removed catalyst into two portions, one of said portions approximately equaling the small amount of catalyst which is continuously added to the catalyst body and the other representing the excess portion of said catalyst, returning the excess portion of said removed catalyst to the catalyst body whereby the catalyst is retained in the reactor a preferentially long time as compared with the vapors, cooling the other portion of removed catalyst with the reaction product at the elevated pressure to form a liquid-catalyst slurry mixture, withdrawing this slurry mixture from the high pressure system, separating the catalyst particles from the liquid portion of this withdrawn slurry mixture, regenerating these catalyst particles and continuously re-introducing these catalytic particles into said body of suspended turbulent catalytic particles in said elevated pressure system.

4. The process of carrying out a continuous catalytic reaction having a neutral to exothermic heat balance which results in deposition of coke on the catalyst and necessitates regeneration of the catalyst to maintain catalyst activity, which process comprises establishing a body of suspended turbulent catalyst particles in a high pressure system, continuously adding catalyst particles to said catalyst body in relatively small amounts as compared with the amount of catalyst in said catalyst body, said amounts corresponding to one part of catalyst to between about 2 and 16 parts by weight of reactant, passing vapors to be catalytically converted into the body of suspended turbulent catalyst particles, continuously removing a mixture of the suspended catalyst and reaction product in vapor form from the catalyst body at a rate whereby the catalyst is retained in the reactor a preferentially long time as compared with the vapors, the amount of catalyst thus removed with the reaction product approximately equaling that which is continuously added to the catalyst body, cooling this mixture of suspended catalyst and reaction product at the elevated pressure to form a liquid-slurry mixture, withdrawing this slurry mixture from the high pressure system, regenerating the separated catalyst at pressures of the order of atmospheric pressure, and continuously re-introducing these regenerated catalyst particles into said body of suspended turbulent catalyst particles in said elevated pressure system.

PAUL W. CORNELL.

REFERENCES CITED

The following references are of record in the file of this patent:

UNITED STATES PATENTS

| Number | Name | Date |
| --- | --- | --- |
| 2,562,804 | Martin et al. | July 31, 1951 |

FOREIGN PATENTS

| Number | Country | Date |
| --- | --- | --- |
| 600,776 | Great Britain | Apr. 19, 1948 |
| 915,068 | France | Oct. 25, 1946 |